(12) United States Patent
Liu et al.

(10) Patent No.: US 12,351,524 B2
(45) Date of Patent: Jul. 8, 2025

(54) PREPARATION METHOD FOR COPPER PLATE-COVERED SILICON NITRIDE CERAMIC SUBSTRATE

(71) Applicant: SHANGHAI INSTITUTE OF CERAMICS, CHINESE ACADEMY OF SCIENCES, Shanghai (CN)

(72) Inventors: Xuejian Liu, Shanghai (CN); Hui Zhang, Shanghai (CN); Xiumin Yao, Shanghai (CN); Yan Liu, Shanghai (CN); Jindi Jiang, Shanghai (CN); Zhengren Huang, Shanghai (CN); Zhongming Chen, Shanghai (CN)

(73) Assignee: SHANGHAI INSTITUTE OF CERAMICS, CHINESE ACADEMY OF SCIENCES, Shanghai (CH)

( * ) Notice: Subject to any disclaimer, the term of this patent is extended or adjusted under 35 U.S.C. 154(b) by 147 days.

(21) Appl. No.: 18/261,078

(22) PCT Filed: Jan. 17, 2022

(86) PCT No.: PCT/CN2022/072347
§ 371 (c)(1),
(2) Date: Jul. 11, 2023

(87) PCT Pub. No.: WO2022/156634
PCT Pub. Date: Jul. 28, 2022

(65) Prior Publication Data
US 2024/0067577 A1    Feb. 29, 2024

(30) Foreign Application Priority Data
Jan. 20, 2021   (CN) .......................... 202110075100.0

(51) Int. Cl.
*B23K 37/00*   (2025.01)
*C04B 35/584*  (2006.01)
*C04B 37/00*   (2006.01)

(52) U.S. Cl.
CPC .......... *C04B 37/006* (2013.01); *C04B 35/584* (2013.01); *C04B 2237/125* (2013.01)

(58) Field of Classification Search
CPC ..... H01L 2924/014; H01L 2924/01322; H01L 2224/32225; H01L 2224/8384;
(Continued)

(56) References Cited

U.S. PATENT DOCUMENTS 5,354,415 A * 10/1994 Fushii .................. C04B 37/026
                                                     216/13
5,928,768 A *  7/1999 Ikeda ..................... H01L 23/15
                                                      428/209
(Continued)

FOREIGN PATENT DOCUMENTS

CN       1597614 A      3/2005
CN      104409425 A     3/2018
(Continued)

OTHER PUBLICATIONS

International Search Report of the International Searching Authority for State Intellectual Property Office of the People's Republic of China in PCT application No. PCT/CN2022/072347 issued on Jan. 17, 2022, which is an international application to which this application claims priority.
(Continued)

*Primary Examiner* — Erin B Saad

(57) ABSTRACT

A preparation method for a copper plate-covered silicon nitride ceramic substrate is provided. The structure of the copper plate-covered silicon nitride ceramic substrate includes a silicon nitride ceramic substrate, copper sheets
(Continued)

disposed on the upper and lower sides of the silicon nitride ceramic substrate and soldering layers disposed between the copper sheets and the silicon nitride ceramic substrate; the composition of the silicon nitride ceramic substrate comprises a silicon nitride phase (more than or equal to 95 wt %); and a grain boundary phase (containing at least three elements (Y, Mg and O) and less than or equal to 5 wt %, and the content of a crystalline phase in the grain boundary phase is more than or equal to 40 vol %); and the sintering aids are $Y_2O_3$ and MgO. The two-step sintering process comprises: in a nitrogen atmosphere, performing low-temperature heat treatment and high-temperature heat treatment in sequence.

12 Claims, 10 Drawing Sheets

(58) Field of Classification Search
CPC ...... B23K 1/0016; B23K 1/19; B23K 1/0008; B23K 35/025; B23K 1/20; B23K 2103/18; B23K 2103/172; B23K 35/001; B23K 35/0244; B23K 35/36; B23K 2103/12; B23K 26/0006; B32B 15/20; B32B 9/005

See application file for complete search history.

(56) References Cited

U.S. PATENT DOCUMENTS

| | | | |
|---|---|---|---|
| 6,107,638 A * | 8/2000 | Sumino | C04B 37/026 257/629 |
| 6,221,511 B1 * | 4/2001 | Sakuraba | C04B 35/581 428/673 |
| 6,261,703 B1 * | 7/2001 | Sasaki | C04B 35/581 428/209 |
| 6,690,087 B2 * | 2/2004 | Kobayashi | H01L 23/3735 257/772 |
| 9,079,264 B2 * | 7/2015 | Tonomura | H05K 3/381 |
| 9,648,737 B2 * | 5/2017 | Terasaki | C22C 9/00 |
| 9,944,565 B2 * | 4/2018 | Osanai | B23K 1/19 |
| 10,199,237 B2 * | 2/2019 | Terasaki | C04B 37/026 |
| 10,370,303 B2 * | 8/2019 | Terasaki | C22C 9/00 |
| 10,798,824 B2 * | 10/2020 | Terasaki | H01L 23/12 |
| 11,393,738 B2 * | 7/2022 | Terasaki | C04B 35/581 |
| 2013/0241046 A1 * | 9/2013 | Miyashita | H01L 23/433 438/126 |
| 2021/0176859 A1 * | 6/2021 | Yuasa | C04B 37/023 |
| 2021/0193554 A1 * | 6/2021 | Kürten | H01L 24/32 |
| 2021/0269368 A1 * | 9/2021 | Cho | C04B 37/026 |

FOREIGN PATENT DOCUMENTS

| | | |
|---|---|---|
| CN | 108383532 A | 8/2018 |
| CN | 108585881 A | 9/2018 |
| CN | 109400175 A | 3/2019 |
| CN | 111253162 A | 6/2020 |
| CN | 111403347 A | 7/2020 |
| CN | 112142476 A | 12/2020 |
| CN | 112159237 A | 1/2021 |
| CN | 112811922 A | 5/2021 |
| EP | 3156366 A1 | 4/2017 |
| JP | 2002293641 A | 10/2002 |

OTHER PUBLICATIONS

Duan, Yusen et al.; "Cost Effective Preparation of Si3N4 Ceramics with Improved Thermal Conductivity and Mechanical Properties"; Journal of the European Ceramic Society 40; Oct. 2019.

* cited by examiner

Table 1:

| | Si$_3$N$_4$/g | Si/g | Y$_2$O$_3$+MgO/g | Y$_2$O$_3$:MgO molar ratio | Pretreatment | Nitridation | Low-temperature heat treatment | High-temperature heat treatment |
|---|---|---|---|---|---|---|---|---|
| Example 1 | 95.0 | 0 | 5.0 | 1.2 : 2.5 | 600°C/2h 5%H$_2$+N$_2$ 0.15MPa | / | 1650°C/2h 2MPa N$_2$ | 1950°C/8h 8MPa N$_2$ |
| Example 2 | 95.0 | 0 | 5.0 | 1.0 : 2.9 | 500°C/3h N$_2$ 0.2MPa | / | 1600°C/2.5h 0.5MPa N$_2$ | 1800°C/4h 1MPa N$_2$ |
| Example 3 | 95.0 | 0 | 5.0 | 1.4 : 2.7 | 700°C/1.5h 1%H$_2$+N$_2$ 0.11MPa | / | 1700°C/1.5h 1MPa N$_2$ | 2000°C/6h 10MPa N$_2$ |
| Example 4 | 95.5 | 0 | 4.5 | 1.3 : 2.8 | 800°C/1h 0.13MPa N$_2$ | / | 1750°C/2h 0.8MPa N$_2$ | 1850°C/12h 3MPa N$_2$ |
| Example 5 | 96.0 | 0 | 4.0 | 1.2 : 2.9 | 700°C/2h 3%H$_2$+N$_2$ 0.18MPa | / | 1800°C/2h 2MPa N$_2$ | 1900°C/10h 5MPa N$_2$ |
| Example 6 | 3.0 | 55.0 | 4.5 | 1.4 : 2.6 | 600°C/3h 5%H$_2$+N$_2$ 0.2MPa | 1450°C/6h 5%H$_2$+N$_2$ 0.2MPa | 1700°C/2h 3MPa N$_2$ | 1950°C/10h 8MPa N$_2$ |
| Example 7 | 6.0 | 54.0 | 5.0 | 1.3 : 2.5 | 650°C/2h 3%H$_2$+N$_2$ 0.12MPa | 1350°C/6h 3%H$_2$+N$_2$ 0.15MPa | 1750°C/2h 1MPa N$_2$ | 2000°C/5h 10MPa N$_2$ |
| Example 8 | 12.5 | 50.0 | 5.0 | 1.2 : 2.8 | 700°C/1.5h 1%H$_2$+N$_2$ 0.15MPa | 1425°C/5h 1%H$_2$+N$_2$ 0.18MPa | 1650°C/2.5h 2MPa N$_2$ | 1900°C/4h 5MPa N$_2$ |
| Example 9 | 15.0 | 48.0 | 5.0 | 1.1 : 2.9 | 500°C/3h 0.18MPa N$_2$ | 1400°C/4h 0.15MPa N$_2$ | 1680°C/2h 0.8MPa N$_2$ | 1850°C/8h 2MPa N$_2$ |
| Example 10 | 0 | 57.0 | 5.0 | 1.0 : 2.6 | 750°C/1.5h 0.1MPa N$_2$ | 1450°C/3h 0.1MPa N$_2$ | 1600°C/1.5h 0.5MPa N$_2$ | 1800°C/6h 0.5MPa N$_2$ |
| Example 11 | 95.0 | 0 | 5.0 | 1.2 : 2.5 | 600°C/2h 5%H$_2$+N$_2$ 0.15MPa | / | 1650°C/2h 2MPa N$_2$ | 1950°C/8h 8MPa N$_2$ |
| Comparative example 1 | 95.0 | 0 | 5.0 | 1.2 : 2.5 | 600°C/2h 5%H$_2$+N$_2$ 0.15MPa | / | 1650°C/2h 2MPa N$_2$ | 1950°C/8h 8MPa N$_2$ |
| Comparative example 2 | 92.0 | 0 | 8.0 | 1.2 : 2.5 | 600°C/2h 5%H$_2$+N$_2$ 0.15MPa | / | 1650°C/2h 2MPa N$_2$ | 1950°C/8h 8MPa N$_2$ |
| Comparative example 3 | 95.0 | 0 | 5.0 | 1.2 : 4.0 | 600°C/2h 5%H$_2$+N$_2$ 0.15MPa | / | 1650°C/2h 2MPa N$_2$ | 1950°C/8h 8MPa N$_2$ |
| Comparative example 4 | 95.0 | 0 | 5.0 | 1.3 : 2.0 | 600°C/2h 5%H$_2$+N$_2$ 0.15MPa | / | 1650°C/2h 2MPa N$_2$ | 1950°C/8h 8MPa N$_2$ |
| Comparative example 5 | 95.0 | 0 | 5.0 | 1.2 : 2.5 | 600°C/2h 5%H$_2$+N$_2$ 0.15MPa | / | / | 1950°C/8h 8MPa N$_2$ |
| Comparative example 6 | 95.0 | 0 | 5.0 | 1.2 : 2.5 | 600°C/2h 5%H$_2$+N$_2$ 0.15MPa | / | 1500°C/2h 2MPa N$_2$ | 1950°C/8h 8MPa N$_2$ |
| Comparative example 7 | 12.5 | 50.0 | 5.0 | 1.2 : 2.8 | 700°C/1.5h 1%H$_2$+N$_2$ 0.15MPa | 1300°C/6h 3%H$_2$+N$_2$ 0.15MPa | 1650°C/2.5h 2MPa N$_2$ | 1900°C/4h 5MPa N$_2$ |
| Comparative example 8 | 12.5 | 50.0 | 5.0 | 1.2 : 2.8 | 700°C/1.5h 1%H$_2$+N$_2$ 0.15MPa | 1550°C/6h 3%H$_2$+N$_2$ 0.15MPa | 1650°C/2.5h 2MPa N$_2$ | 1900°C/4h 5MPa N$_2$ |

FIG.13

Table 2:

| | $Si_3N_4$ /wt% | Content of grain boundary phase /wt% | Content of crystalline phase in grain boundary phase /vol% | Bending strength /MPa | Thermal conductivity $(W \cdot m^{-1} \cdot K^{-1})$ | Breakdown field strength /KV·mm$^{-1}$ |
|---|---|---|---|---|---|---|
| Example 1 | ≥95 | < 5 | 54 | 810 | 106 | 45 |
| Example 2 | ≥95 | < 5 | 45 | 850 | 93 | 38 |
| Example 3 | ≥95 | < 5 | 48 | 750 | 98 | 42 |
| Example 4 | ≥95 | < 5 | 46 | 770 | 95 | 40 |
| Example 5 | ≥95 | < 5 | 51 | 760 | 102 | 45 |
| Example 6 | ≥95 | < 5 | 60 | 710 | 110 | 48 |
| Example 7 | ≥95 | < 5 | 56 | 700 | 108 | 44 |
| Example 8 | ≥95 | < 5 | 46 | 730 | 98 | 40 |
| Example 9 | ≥95 | < 5 | 45 | 750 | 94 | 38 |
| Example 10 | ≥95 | < 5 | 42 | 780 | 91 | 35 |
| Example 11 | ≥95 | < 5 | 54 | 820 | 108 | 47 |
| Comparative example 1 | ≥95 | < 5 | 43 | 830 | 68 | 16 |
| Comparative example 2 | ≥90 | < 10 | 46 | 820 | 72 | 18 |
| Comparative example 3 | ≥95 | < 5 | 25 | 750 | 73 | 14 |
| Comparative example 4 | ≥95 | < 5 | 42 | 780 | 80 | 20 |
| Comparative example 5 | ≥95 | < 5 | 36 | 720 | 70 | 13 |
| Comparative example 6 | ≥95 | < 5 | 30 | 680 | 72 | 14 |
| Comparative example 7 | ≥95 | < 5 | 26 | 650 | 68 | 11 |
| Comparative example 8 | ≥95 | < 5 | 22 | 610 | 65 | 10 |

FIG. 14

Table 3:

| | Ag (Weight proportion /Average grain size/O content) | Cu (Weight proportion /Average grain size/O content) | Ti (Weight proportion /Average grain size/O content) | Tape-casting atmosphere $N_2$/MPa | Tape-cast film drying temperature (previous stage and latter stage)/°C | Solder film thickness /μm |
|---|---|---|---|---|---|---|
| Example 12 | 63%, 8μm, 0.01% | 35%, 6μm, 0.01% | 2%, 2μm, 0.1% | 0.12 | 45/65 | 50 |
| Example 13 | 65%, 10μm, 0.01% | 33.5%, 8μm, 0.01% | 1.5%, 1μm, 0.05% | 0.20 | 40/60 | 20 |
| Example 14 | 60%, 15μm, 0.02% | 36%, 16μm, 0.02% | 4%, 5μm, 0.18% | 0.10 | 65/85 | 60 |
| Example 15 | 64%, 8μm, 0.01% | 33%, 16μm, 0.02% | 3%, 3μm, 0.1% | 0.15 | 50/70 | 30 |
| Example 16 | 62%, 15μm, 0.02% | 37%, 6μm, 0.01% | 1%, 3μm, 0.1% | 0.18 | 55/75 | 40 |
| Example 17 | 63%, 8μm, 0.01% | 35%, 6μm, 0.01% | 2%, 2μm, 0.1% | 0.12 | 45/65 | 50 |
| Example 18 | 64%, 8μm, 0.01% | 33%, 16μm, 0.02% | 3%, 3μm, 0.1% | 0.15 | 50/70 | 30 |
| Comparative example 9 | 63.5%, 8μm, 0.01% | 36%, 6μm, 0.01% | 0.5%, 2μm, 0.1% | 0.12 | 45/65 | 50 |
| Comparative example 10 | 60%, 8μm, 0.01% | 33%, 6μm, 0.01% | 7%, 2μm, 0.1% | 0.12 | 45/65 | 50 |
| Comparative example 11 | 63%, 8μm, 0.01% | 35%, 6μm, 0.01% | 2%, 2μm, 0.1% | 0.12 | 45/65 | 10 |
| Comparative example 12 | 63%, 8μm, 0.01% | 35%, 6μm, 0.01% | 2%, 2μm, 0.1% | 0.12 | 55/75 | 80 |
| Comparative example 13 | 63%, 8μm, 0.01% | 35%, 6μm, 0.01% | 2%, 2μm, 0.1% | 0.12 | 45/65 | 50 |
| Comparative example 14 | 63%, 8μm, 0.01% | 35%, 6μm, 0.01% | 2%, 2μm, 0.1% | 0.12 | 45/65 | 50 |
| Comparative example 15 | 63%, 8μm, 0.01% | 35%, 6μm, 0.01% | 2%, 2μm, 0.1% | 0.12 | 45/65 | 50 |
| Comparative example 16 | 63%, 8μm, 0.01% | 35%, 6μm, 0.01% | 2%, 2μm, 0.1% | 0.12 | 45/65 | 50 |
| Comparative example 17 | 63%, 8μm, 0.01% | 35%, 6μm, 0.01% | 2%, 2μm, 0.1% | 0.12 | 45/65 | 50 |
| Comparative example 18 | 63%, 8μm, 0.01% | 35%, 6μm, 0.01% | 2%, 2μm, 0.1% | 0.12 | 45/65 | 50 |

FIG. 15

Table 4:

|  | Copper foil thickness /mm | $N_2$/ MPa | Debinding | Vacuum degree (Pa) | Soldering | Peel strength (N/mm) | thermal shock life/times | note |
|---|---|---|---|---|---|---|---|---|
| Example 12 | 0.30 | 0.15 | 650°C/2h | $2*10^{-3}$ | 900°C/10min | 15 | 200 | Intact |
| Example 13 | 0.15 | 0.20 | 500°C/3h | $5*10^{-4}$ | 890°C/10min | 16 | 200 | Intact |
| Example 14 | 1.5 | 0.15 | 800°C/2h | $1*10^{-2}$ | 860°C/20min | 11 | 200 | Intact |
| Example 15 | 0.7 | 0.12 | 600°C/2h | $5*10^{-3}$ | 880°C/15min | 13 | 200 | intact |
| Example 16 | 1.0 | 0.2 | 700°C/2h | $3*10^{-3}$ | 920°C/5min | 12 | 200 | intact |
| Example 17 | 0.30 | 0.15 | 650°C/2h | $2*10^{-3}$ | 900°C/10min | 16 | 200 | intact |
| Example 18 | 0.7 | 0.12 | 600°C/2h | $5*10^{-3}$ | 880°C/15min | 14 | 200 | Intact |
| Comparative example 9 | 0.30 | 0.15 | 650°C/2h | $2*10^{-3}$ | 900°C/10min | 7 | 120 | intact |
| Comparative example 10 | 0.30 | 0.15 | 650°C/2h | $2*10^{-3}$ | 900°C/10min | 8 | 150 | Intact |
| Comparative example 11 | 0.30 | 0.15 | 650°C/2h | $2*10^{-3}$ | 900°C/10min | 12 | 120 | intact |
| Comparative example 12 | 0.30 | 0.15 | 650°C/2h | $2*10^{-3}$ | 900°C/10min | 7 | 100 | Intact |
| Comparative example 13 | 2.0 | 0.15 | 650°C/2h | $2*10^{-3}$ | 900°C/10min | 12 | 80 | Intact |
| Comparative example 14 | 0.30 | 0.15 | 650°C/2h | $1*10^{-1}$ | 900°C/10min | 6 | 130 | Intact |
| Comparative example 15 | 0.30 | 0.15 | 650°C/2h | $2*10^{-3}$ | 950°C/10min | / | / | Cracked |
| Comparative example 16 | 0.30 | 0.15 | 650°C/2h | $2*10^{-3}$ | 830°C/10min | 5 | 100 | Intact |
| Comparative example 17 | 0.30 | 0.15 | 650°C/2h | $2*10^{-3}$ | 900°C/30min | 8 | 100 | intact |
| Comparative example 18 | 0.30 | 0.15 | 650°C/2h | $2*10^{-3}$ | 900°C/1min | 9 | 100 | intact |

FIG. 16

PREPARATION METHOD FOR COPPER PLATE-COVERED SILICON NITRIDE CERAMIC SUBSTRATE

TECHNICAL FIELD

The present disclosure relates to a preparation method for a copper plate-covered copper plate-covered silicon nitride ceramic substrate, which belongs to the field of semiconductor materials and devices.

BACKGROUND

In recent years, semiconductor devices have rapidly developed towards the direction of high power, high frequency and integration. The heat generated by the operation of a semiconductor device is a key factor which causes the failure of the semiconductor device, and the thermal conductivity of an insulating substrate is a key to affect the heat dissipation of the whole semiconductor device. In addition, in fields such as electric vehicle, high-speed railway and rail transit, semiconductor devices often encounter complex mechanical environments, such as bumps and vibrations, during use, which puts strict requirements on the reliability of materials used.

Silicon nitride ($Si_3N_4$) ceramic with high thermal conductivity is considered as the best insulating semiconductor substrate material with both high strength and high thermal conductivity due to its excellent mechanical and thermal properties, and has great potential to be applied to the heat dissipation of high-power insulated gate bipolar transistors (IGBTs). The theoretical thermal conductivity of silicon nitride crystal can reach more than 400 $W \cdot m^{-1} \cdot K^{-1}$, and it has the potential to become a substrate with high thermal conductivity. With the potential of excellent mechanical properties and high thermal conductivity, silicon nitride ceramic is expected to make up for the defects of existing ceramic substrate materials, such as alumina and aluminum nitride, and has great potential to be applied to high-end semiconductor devices, particularly heat-dissipating substrates for high-power IGBTs. However, the thermal conductivity of conventional silicon nitride ceramic materials is only 20 to 30 $W \cdot m^{-1} \cdot K^{-1}$, which cannot meet the requirement of application in the heat dissipation of high-power semiconductor device substrates.

On the other hand, silicon nitride belongs to a compound with strong covalent bonds, and is difficult to be sintered densely by solid diffusion. Thus, it is necessary to add an appropriate amount (usually more than 5 wt %) of rare-earth oxides and/or metal oxides (e.g., $Y_2O_3$, $La_2O_3$, MgO, $Al_2O_3$ and CaO) as sintering aids. However, the addition of the sintering aids will significantly reduce the thermal conductivity of silicon nitride ceramic. Although a low content of sintering aids helps to achieve high thermal conductivity, the low content of sintering aids brings the problem of sintering densification of silicon nitride ceramic.

Moreover, with the development of power devices (including LEDs (light-emitting diodes), LDs (laser diodes), IGBTs (insulated-gate bipolar transistors), CPV (concentrating photovoltaic), etc.), heat dissipation has become a key technology affecting the performance and reliability of devices. For electronic devices, the useful life of devices is usually reduced by 30% to 50% each time when temperature increases by 10° C. Therefore, selecting suitable packaging materials and processes, and increasing the heat dissipation capacity of devices have become difficult technical problems that need to be solved for the development of power devices.

The ceramic substrate, also referred to as a ceramic printed circuit board, includes a ceramic substrate and a metal circuit layer. For electronic packaging, the packaging substrate plays a key role in connecting internal and external heat dissipation channels as an intermediate, and has the functions of electrical interconnection and mechanical support. Silicon nitride ceramic has the advantages of high thermal conductivity, good heat resistance, high mechanical strength, low thermal expansion coefficient and so on, and is a preferred substrate material for the packaging of power semiconductor devices. As an important component for high-power devices, the ceramic-base copper clad laminate has both the characteristics of ceramic, such as high thermal conductivity, high electrical insulation, high mechanical strength and low expansion, and the high electrical conductivity and excellent soldering property of oxygen-free copper, and can be etched to form various patterns like PCB circuit boards with polymer substrates.

According to packaging structures and application requirements, ceramic substrates may be divided into two major categories: planar ceramic substrates and three-dimensional ceramic substrates. According to different preparation principles and processes, planar ceramic substrates may be divided into thin-film ceramic substrates, thick-film printed ceramic substrates, directly bonded copper ceramic substrates, active metal brazed ceramic substrates, directly electroplated copper ceramic substrates, laser activated cermet substrates, etc.

Among them, the active metal brazed ceramic substrate (AMB) (AMB ceramic substrate) utilizes a solder containing a small amount of active metal element to implement the soldering between a copper foil and a ceramic substrate and relies on the chemical reaction between the active solder and the ceramic interface to realize bonding, the AMB ceramic substrate has the unique advantages of high bonding strength, high impact failure resistance at high and low temperatures, high reliability, etc., and has become a preferred packaging material for new-generation semiconductors and novel high-power electronic devices.

For the AMB soldering process for the ceramic substrate and the copper foil, an active metal solder layer is applied on the surface of the ceramic substrate first, and heating is then performed in vacuum, so that the active metal element and the surface element of the ceramic substrate are chemically bonded, and thereby, the ceramic substrate and the copper foil are connected at high strength. The methods for applying the solder layer on the substrate surface mainly include screen printing, plating, sputtering, spraying, etc., and the different processes have their own characteristics.

Technical Solution

In view of the aforementioned problem, the objective of the present disclosure is to provide a copper plate-covered silicon nitride ceramic substrate and a preparation method thereof.

In one aspect, the present disclosure provides a preparation method for a copper plate-covered silicon nitride ceramic substrate, wherein the copper plate-covered silicon nitride ceramic substrate comprises a silicon nitride ceramic substrate, copper sheets disposed on the upper and lower sides of the silicon nitride ceramic substrate and soldering layers disposed between the copper sheets and the silicon nitride ceramic substrate; the composition of the silicon nitride ceramic substrate comprises a silicon nitride phase and a grain boundary phase; the content of the silicon nitride phase is more than or equal to 95 wt %; the grain boundary phase is a mixture containing at least three elements (Y, Mg and O), the composition and content of the grain boundary phase are controlled by a two-step sintering process, so that the content of the grain boundary phase is less than or equal to 5 wt %, and the content of a crystalline phase in the grain boundary phase is more than or equal to 40 vol %; the sintering aids for the preparation of the silicon nitride ceramic substrate are $Y_2O_3$ and MgO, the molar ratio of $Y_2O_3$ to MgO is (1.0 to 1.4):(2.5 to 2.9), and the two-step sintering process comprises: in a nitrogen atmosphere with a atmospheric pressure of 0.5 MPa to 10 MPa, performing low-temperature heat treatment at 1600° C. to 1800° C. and high-temperature heat treatment performed at 1800° C. to 2000° C. in sequence; the thickness of the silicon nitride ceramic substrate is 0.2 mm to 2.0 mm; the composition of the soldering layer is AgCuTi, wherein the weight ratio of Ag:Cu:Ti is x:y:z, where x is equal to 0.60 to 0.65, y is equal to 0.33 to 0.37, z is equal to 0.01 to 0.04, x+y+z=1, and the thickness of the soldering layer is 20 to 60 microns; the thickness of the copper sheet is 0.1 mm to 1.5 mm; the copper sheets, solder foils forming the soldering layers and the silicon nitride ceramic substrate are stacked according to the structure of the copper plate-covered silicon nitride ceramic substrate, and after debinding in a protective atmosphere, vacuum soldering is performed at 860° C. to 920° C. and kept for 5 to 20 minutes to obtain the copper plate-covered silicon nitride ceramic substrate.

Preferably, the total amount of impurities in the silicon nitride ceramic material is less than or equal to 1.0 wt %; and the impurities include at least one of lattice oxygen, metal impurity ions and impurity carbon.

Preferably, the thickness of the copper sheet is 0.2 mm to 1.0 mm.

Preferably, the average grain size of the silver powder is 5 μm to 20 μm, and the oxygen content is not more than 0.05%; the average grain size of the copper powder is 5 μm to 20 μm, and the oxygen content is not more than 0.05%; the average grain size of the titanium powder is 1 μm to 5 μm, and the oxygen content is not more than 0.2%; and the protective atmosphere is a nitrogen atmosphere.

Preferably, a tape-cast film green body is dried by a flowing hot $N_2$ atmosphere with increasing temperature, and the hot $N_2$ atmosphere has a temperature range from 40° C. to 85° C. and an atmosphere pressure of 0.1 MPa to 0.2 MPa; preferably, there are two temperature stages of the nitrogen atmosphere, the atmosphere temperature range of the previous stage is 40° C. to 65° C., the atmosphere temperature range of the latter stage is 60° C. to 85° C., and the atmosphere temperature of the previous stage is less than the atmosphere temperature of the latter stage.

Preferably, the parameters of the debinding include: $N_2$ atmosphere pressure: 0.1 MPa to 0.2 MPa; treatment temperature: 500° C. to 800° C.; and duration of treatment: 1 to 3 hours.

Preferably, the preparation method for the silicon nitride ceramic substrate comprises the following steps: (1) at least one of silicon powder and silicon nitride powder as an original powder and $Y_2O_3$ powder and MgO powder as sintering aids are added with an organic solvent and a binder and mixed in a protective atmosphere to obtain a mixed slurry; (2) the resulting mixed slurry is tape-cast in a protective atmosphere to obtain a green body; (3) the resulting green body is put into a reducing atmosphere and pretreated at 500° C. to 800° C. to obtain a biscuit; (4) the resulting biscuit is put into a nitrogen atmosphere and subjected to low-temperature heat treatment at 1600° C. to 1800° C. and high-temperature heat treatment at 1800° C. to 2000° C. in sequence to obtain the silicon nitride ceramic substrate; preferably, the protective atmosphere is an inert atmosphere or a nitrogen atmosphere, preferably a nitrogen atmosphere; and the reducing atmosphere is a hydrogen/nitrogen mixed atmosphere with a hydrogen content not higher than 5 vol %.

Preferably, the preparation method for the silicon nitride ceramic substrate comprises the following steps: (1) at least one of silicon powder and silicon nitride powder as an original powder and $Y_2O_3$ powder and MgO powder as sintering aids are mixed and formed into a green body in a protective atmosphere; (2) the resulting green body is put into a reducing atmosphere and pretreated at 500° C. to 800° C. to obtain a biscuit; (3) the resulting biscuit is put into a nitrogen atmosphere and subjected to low-temperature heat treatment at 1600° C. to 1800° C. and high-temperature heat treatment at 1800° C. to 2000° C. in sequence to obtain the silicon nitride ceramic substrate; preferably, the protective atmosphere is an inert atmosphere or a nitrogen atmosphere, preferably a nitrogen atmosphere; and the reducing atmosphere is a hydrogen/nitrogen mixed atmosphere with a hydrogen content not higher than 5 vol %.

Beneficial Effect

According to the present disclosure, the quantity of structural defects, such as lattice vacancies and dislocations, is reduced by controlling the oxygen content (including prevention of material oxidation and pretreatment by reducing atmosphere in the process of mixing and green body formation), controlling the metal impurity ion content and controlling the carbon content in the preparation process, so as to achieve the object of increasing the thermal conductivity and breakdown field strength of the silicon nitride ceramic material. At the same time, the composition and content of the grain boundary phase are controlled by the two-step sintering process: at the stage of low-temperature sintering, the sintering aids are allowed to produce a liquid phase to promote densification; at the high-temperature stage, the remaining MgO sintering aid is volatilized, and at the same time, the content of the glass phase in the grain boundary phase is further reduced, thus achieving the object of reducing the content of the grain boundary phase and increasing the crystallization degree to increase the thermal conductivity. Moreover, the high breakdown field strength of the material is conducive to the application in high-power devices as well as the reduction of the thickness of the substrate material and the reduction of thermal resistance, so that a copper clad laminate made of this material has the typical characteristics of thermal shock resistance, high reliability and long service life. On the basis of the homogeneous mixing of the active metal powders, the present disclosure firstly adopts the tape-casting method to form the solder foil green body, so as to ensure the uniform distribution of each component in the solder and the consistency of thickness. By using the inert atmosphere for protection in the process of mixing for solder and formation, the oxidation of the metal powders is prevented, thus ensuring the high-strength soldering of the silicon nitride ceramic copper clad laminate. Moreover, the solder is evenly applied on the surface of the ceramic substrate by forming the solder foil green body, which can avoid the phenomenon of solder unevenness caused by the conventional screen printing process, realize the low-stress soldering of the silicon nitride ceramic copper clad laminate and achieve the characteristics of evenly distributing the metal solder layers between the ceramic substrate and the copper sheets, prevention of missing soldering, and increased reliability. In addition, for ceramic copper clad laminate prepared based on the conventional aluminum nitride-alumina-zirconia toughened alumina (ZTA) ceramic substrate, only a thin copper foil (generally not more than 0.8 mm) can be soldered on the ceramic copper clad laminate, and if the thickness of the copper foil is too large, the reliability will decrease sharply. In contrast, the method of the present disclosure is suitable for soldering a high-thermal conductivity ceramic substrate with a copper foil with a large thickness (0.1 mm to 1.5 mm), and even for a copper foil with a thickness more than 1 mm, a silicon nitride ceramic copper clad laminate with high strength, low stress and high reliability can still be prepared. The copper foil with large thickness can withstand greater current density and therefore is suitable for semiconductor devices with higher power.

BRIEF DESCRIPTION OF DRAWINGS

FIG. 13 is a Table 1 which shows the composition of a silicon nitride ceramic material and a preparation process therefor.

FIG. 14 is a Table 2 showing the phase composition and property parameters of the silicon nitride ceramic material.

FIG. 15 is a Table 3 which shows the composition of the solder foil prepared according to some embodiments of the present disclosure.

FIG. 16 is a Table 4 which shows the preparation parameters and property parameters of the copper plate-covered silicon nitride ceramic substrate according to some embodiments of the present disclosure.

DETAILED DESCRIPTION OF PREFERRED EMBODIMENTS

Figure 1:
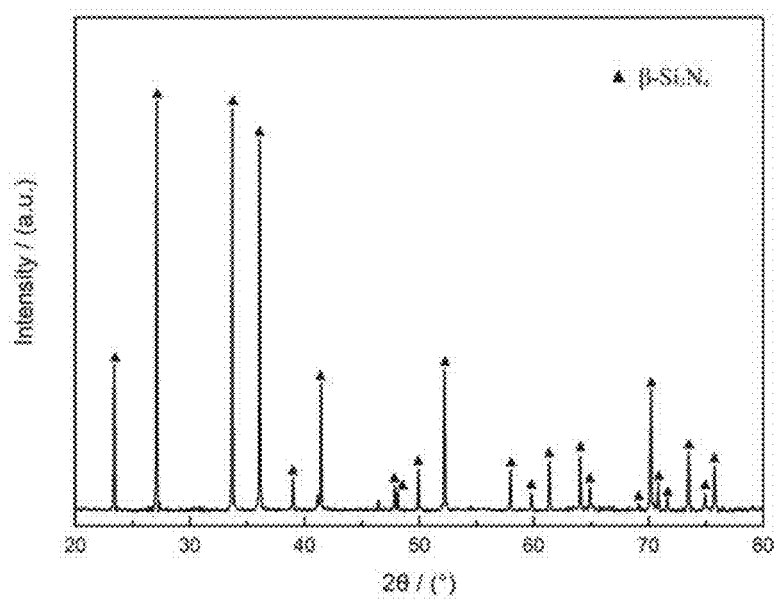
FIG. 1 is an XRD (X-Ray Diffraction) pattern of a silicon nitride ceramic material prepared in Example 1.

The present disclosure will be further illustrated by the following embodiments below, and it should be understood that the following embodiments are only used to illustrate the present disclosure rather than to limit it.

In the present disclosure, a silicon nitride ceramic material contains not less than 95% of silicon nitride phase and a grain boundary phase with a crystalline phase content not less than 40%. Moreover, the content of lattice oxygen, metal impurity ions, carbon impurities and other impurities in the resulting silicon nitride ceramic material is low, and the total amount is below 1.0 wt %. Therefore, the silicon nitride ceramic material in the present disclosure has high thermal conductivity and breakdown field strength.

In one embodiment of the present disclosure, a preparation process in a purified protective atmosphere is adopted to prevent air or hot air from contacting the material, and the impurity content and oxygen content in the prepared ceramic are controlled, so as to increase the thermal conductivity and breakdown field strength of the material without reducing the bending strength of the material. A method for preparing a silicon nitride ceramic material according to the present disclosure will be illustrated below.

The method for preparing a silicon nitride ceramic material specifically includes the following steps: mixing and green body formation in protective atmosphere; pretreatment in reducing atmosphere; and sintering in nitrogen atmosphere and control of sintering system.

Mixing in protective atmosphere: Original powder and sintering aids $Y_2O_3$ powder and MgO powder are added with anhydrous ethanol as a solvent in a closed container, uniformly mixed under the protection of the protective atmosphere and then dried to obtain a powdery mixture. Alternatively, the original powder and the sintering aids $Y_2O_3$ powder and the MgO powder are put into a closed container, added with anhydrous ethanol as an organic solvent and PVB as a binder and then homogeneously mixed under the protection of the protective atmosphere to obtain a mixed slurry. The binder may be 5 wt % to 9 wt % of the total weight of the original powder and the sintering aids. The solid content of the resulting mixed slurry is 50 wt % to 70 wt %.

In an alternative embodiment, the protective atmosphere for mixing is an inert atmosphere or a nitrogen atmosphere, preferably a nitrogen atmosphere. Preferably, a closed container with a polyurethane or nylon lining is used for mixing, and nitrogen is introduced into the container to prevent the entry of air.

In an alternative embodiment, the original powder is silicon nitride powder, silicon powder or a powdery mixture of silicon nitride powder and silicon powder. The percentage by weight of the silicon powder in the powdery mixture of silicon nitride and silicon is not less than 75%, that is, silicon nitride generated after the nitridation of the Si powder accounts for more than 80% of the percentage by weight of all the silicon nitride phase.

In an alternative embodiment, the total weight of the sintering aids ($Y_2O_3$ powder and MgO powder) does not exceed 5 wt % of the total weight of original powder+ sintering aids. If there is too much sintering aids, the thermal conductivity and breakdown field strength of the prepared silicon nitride ceramic material will decrease due to the increase of the grain boundary phase content in the material. If there is too little sintering aids, densification cannot be fully promoted, resulting in the low density of the prepared silicon nitride ceramic material and an increase in the number of pores, and as a result, the thermal conductivity and breakdown field strength of the material are decreased. More preferably, the molar ratio of the sintering aids $Y_2O_3$ to MgO may be (1.0 to 1.4):(2.5 to 2.9). If MgO is excessive, the eutectic point temperature of the liquid phase formed by the sintering aids will be relatively low, and MgO will be severely volatilized at high temperature, resulting a low thermal conductivity and breakdown field strength of the prepared silicon nitride ceramic material. If there is a small amount of MgO, due to the low proportion of MgO among the sintering aids, the eutectic point temperature of the liquid phase formed by the sintering aids is relatively high, and the material densification effect is relatively poor, resulting in an obvious decrease in both the thermal conductivity and breakdown field strength of the prepared silicon nitride ceramic material.

Green body formation in protective atmosphere: In the protective atmosphere, the powdery mixture is directly press-molded to obtain a green body. The compression molding method includes but is not limited to dry press molding, isostatic press molding, etc. Alternatively, in the protective atmosphere, the mixed slurry is directly tape-cast to obtain a green body (sheet green body). Preferably, before tape-casting, the mixed slurry is degassed in vacuum (the vacuum degree is generally −0.1 kPa to −10 kPa, lasting for 4 to 24 hours). More preferably, the thickness of the sheet green body is adjusted by controlling the height of the scraper for tape-casting. In an alternative embodiment, the protective atmosphere for green body formation may be an inert atmosphere or a nitrogen atmosphere, preferably a nitrogen atmosphere. Generally, nitrogen is directly introduced for protection in the process of formation.

Pretreatment of formed green body in reducing atmosphere: Pretreatment is performed on the formed green body in the reducing atmosphere at a certain temperature to remove oxygen from the original powder and organic matters from the green body. In an alternative embodiment, if the original powder is silicon powder or a powdery mixture of silicon nitride and silicon, the green body is pretreated in the reducing atmosphere at a certain temperature before being further nitrided in the reducing atmosphere.

In an alternative embodiment, the pretreatment may be performed in a reducing nitrogen atmosphere with a hydrogen content not higher than 5%, and the gas pressure of the reducing atmosphere is 0.1 MPa to 0.2 MPa. The pretreatment temperature may be 500° C. to 800° C., and the temperature preservation time may be 1 to 3 hours.

In an alternative embodiment, the nitridation may be performed in a nitrogen atmosphere with a hydrogen content not higher than 5%, and the atmosphere pressure is 0.1 MPa to 0.2 MPa. The nitridation temperature is 1350° C. to 1450° C., and the temperature preservation time is 3 to 6 hours.

The sintering treatment of the green body includes low-temperature heat treatment and high-temperature heat treatment. Specifically, sintering densification is performed under high nitrogen pressure by adopting a step-by-step sintering process, which includes low-temperature heat treatment for inhibiting the volatilization of low-melting substances in the sintering aids and further high-temperature sintering for densification. In the present disclosure, gas pressure sintering under the condition of high nitrogen pressure should be adopted for sintering treatment, and the atmospheric pressure may be 0.5 MPa to 10 MPa. The green body may be put into a BN crucible for sintering treatment. The temperature of low-temperature heat treatment (low-temperature sintering) may be 1600° C. to 1800° C., and the temperature preservation time may be 1.5 to 2.5 hours. The temperature of high-temperature heat treatment (high-temperature sintering) may be 1800° C. to 2000° C., and the temperature preservation time may be 4 to 12 hours.

In the present disclosure, the content of lattice oxygen, metal impurity ions, impurity carbon and so on in the prepared silicon nitride ceramic is low, so it has the characteristics of high thermal conductivity (more than 90 W·m$^{-1}$·K$^{-1}$) and high breakdown field strength (more than 30 KV/mm).

In the present disclosure, a silicon nitride ceramic copper clad laminate is prepared by adopting an active metal soldering process, which includes: solder mixing, formation of solder foil green body, cutting and stacking of solder foil green body, debinding of stacked sheets and vacuum soldering of silicon nitride copper clad laminate. A preparation method for a copper plate-covered silicon nitride ceramic substrate according to the present disclosure will be illustrated below by way of example.

Mixing for solder: Silver powder, copper powder, titanium powder, organic solvent and binder are homogeneously mixed under the protection of a $N_2$ atmosphere in a closed container to obtain a mixed slurry. Specifically, the materials are mixed using the closed container by wet ball milling, and 0.1 MPa $N_2$ atmosphere was injected into the container to prevent the entry of air. The percentage by weight of the silver powder may be 60% to 65%, the average grain size may be 5 μm to 20 μm, and the oxygen content is not more than 0.05%; the percentage by weight of the copper powder may be 33% to 37%, the average grain size may be 5 μm to 20 μm, and the oxygen content is not more than 0.05%; the percentage by weight of the titanium powder may be 1% to 4%, the average grain size may be 1 μm to 5 μm, and the oxygen content is not more than 0.2%. In an alternative embodiment, the binder may be polyvinyl butyral (PVB), and the amount of the binder added may be 5 wt % to 15 wt % of the total weight of the silver powder, the copper powder and the titanium powder. Preferably, the slurry also includes other aids, e.g. at least one of defoamer, dispersant and plasticizer. The defoamer may be oleic acid, the added amount may be 0.2 wt % to 1.0 wt % of the total weight of the silver powder, the copper powder and the titanium powder. The dispersant may be at least one of polyethylene glycol (PEG) and triethyl phosphate (TEP), and the adding amount may be 0.2 wt % to 1.0 wt % of the total weight of the silver powder, the copper powder and the titanium powder. The plasticizer may be at least one of diethyl phthalate (DEP), dibutyl phthalate (DBP) and polyethylene glycol (PEG), and the added amount may be 2 wt % to 6 wt % of the total weight of the silver powder, the copper powder and the titanium powder. The solid content of the mixed slurry of the solder is 55 wt % to 75 wt %.

Formation of solder foil green body: The mixed slurry is tape-cast in a $N_2$ atmosphere and dried in a hot $N_2$ atmosphere to prepare a solder foil green body with uniform thickness. The thickness of the formed solder foil green body is 20 μm to 60 μm, and the thickness deviation is not more than ±10 μm.

In an alternative embodiment, the tape-cast film green body is dried by a flowing hot $N_2$ atmosphere with increasing temperature, and the hot $N_2$ atmosphere has a temperature range from 40° C. to 85° C. and an atmosphere pressure of 0.1 MPa to 0.2 MPa. In the flowing hot $N_2$ atmosphere with increasing temperature, the atmosphere temperature range of the previous stage is 40° C. to 65° C., and the atmosphere temperature range of the latter stage is 60° C. to 85° C.

Cutting and stacking of solder foil green body: The dried solder foil green body is cut into foils matching the size of the silicon nitride ceramic substrate, and the silicon nitride ceramic substrate, the solder foil green bodies and the copper foils are stacked. The stacking of the solder green bodies is to place two solder foil green bodies on the upper and lower surfaces of the silicon nitride substrate respectively and then place a layer of copper foil with a matching size on the outer side of each solder foil green body. In the embodiment, the structure of the stacked sheets comprises a copper foil, a solder foil green body, a silicon nitride substrate, a solder foil green body, and a copper foil.

Debinding of stacked sheets: The stacked sheets are subjected to heat treatment under the conditions of micro-positive pressure and certain temperature. In the debinding of the stacked sheets, the micro-positive pressure is generated by introducing a $N_2$ atmosphere with an atmosphere pressure of 0.1 MPa to 0.2 MPa, the treatment temperature is 500° C. to 800° C., and the duration of treatment is 1 to 3 hours.

Vacuum soldering of silicon nitride copper clad laminate: Vacuum soldering is performed on the stacked sheets under the conditions of vacuum and certain temperature. The parameters of vacuum soldering include: vacuum degree: $10^{-2}$ Pa to $10^{-4}$ Pa; soldering temperature: 860° C. to 920° C.; and duration of heat preservation: 5 to 20 minutes.

In the present disclosure, the silicon nitride ceramic material may also be made into a copper clad laminate which can be used as a heat dissipation substrate for high-power insulated gate bipolar transistor (IGBT) modules. The copper clad laminate made of the resulting silicon nitride ceramic has the characteristics of thermal shock resistance, high reliability and long service life.

Examples will be taken to further illustrate the present disclosure in detail below. It should also be understood that the following examples are only used to further illustrate the present disclosure rather than to limit the protection scope of the present disclosure. All non-essential improvements and adjustments which are made by those skilled in the art according to the above contents of the present disclosure shall fall within the protection scope of the present disclosure. The specific technological parameters of the following examples are merely one example in an appropriate range, that is, those skilled in the art can make choices within the appropriate range through the description herein, but the choices are not limited to the specific values of the following examples.

Example 1

Firstly, 95 g of $Si_3N_4$ powder, 5 g of sintering aid powders ($Y_2O_3$:MgO=1.2:2.5, molar ratio), 1 g of castor oil, 1 g of PEG (polyethylene glycol), 70 g of anhydrous ethanol and 200 g of silicon nitride milling balls were put into a polyurethane-lined ball milling tank with an atmosphere protection function, which was vacuumized and filled with a $N_2$ protective atmosphere in sequence after being sealed by a ball milling tank cover, and ball milling and mixing were performed for 6 hours to obtain a slurry; 5 g of PVB (polyvinyl butyral) and 3 g of DBP (dibutyl phthalate) were further added to the aforementioned slurry, and ball milling was continued for 6 hours under the protection of the $N_2$ atmosphere to obtain a homogeneous slurry; secondly, the slurry was degassed in vacuum for 6 hours, and was tape-cast under the protection of the $N_2$ atmosphere to form a substrate green body with a thickness of d±0.05 mm (d=0.2 to 2.0); thirdly, the formed substrate green body was cut into a desired shape and put into a BN crucible, which was put into a carbon tube furnace; then, heat treatment was performed according to the following process sequence: (1) under the protection of 0.15 MPa $N_2$ atmosphere (containing 5% of $H_2$), debinding pretreatment was performed for 2 hours after temperature was raised to 600° C. at a rate of 5° C./min; (2) under the protection of 2 MPa $N_2$ atmosphere, low-temperature heat treatment was performed for 2 hours after temperature was raised to 1650° C. at a rate of 5° C./min; (3) under the protection of 8 MPa $N_2$ atmosphere, high-temperature sintering was performed for 8 hours after temperature was raised to 1950° C. at a rate of 3° C./min; (4) the resulting silicon nitride ceramic substrate material was cooled to room temperature along with the furnace.

Figure 2:
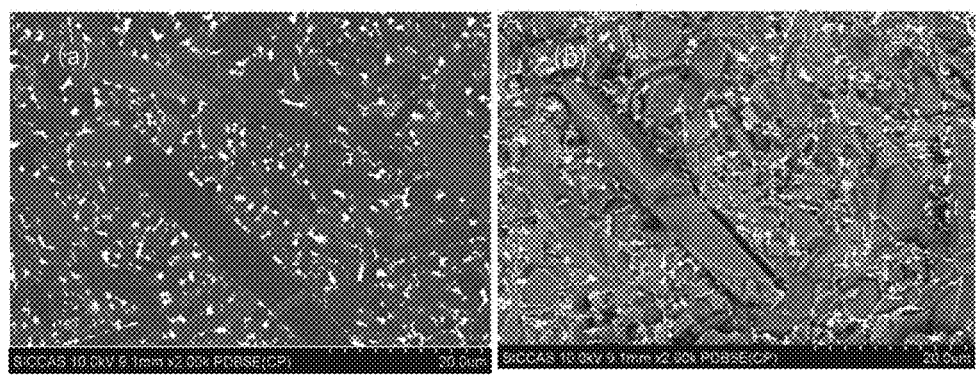
FIG. 2 is a typical SEM (Scanning Electron Microscope) microstructure of the silicon nitride ceramic material prepared in Example 1.
Figure 3:
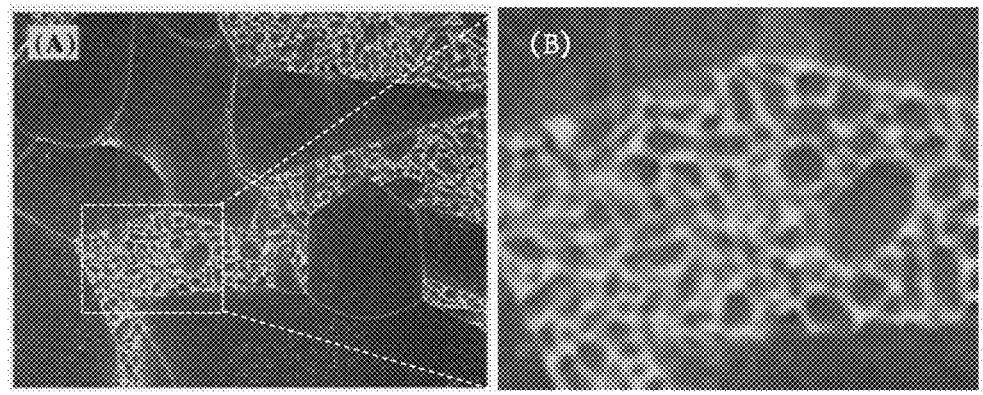
FIG. 3 is a typical TEM (Transmission Electron Microscope) microstructure of the silicon nitride ceramic material prepared in Example 1.

The bending strength of the silicon nitride ceramic substrate material prepared in Example 1 is 810 MPa, the thermal conductivity is 106 $W·m^{-1}·K^{-1}$, and the breakdown field strength is 45 kV/mm. The XRD pattern of this material is shown in FIG. 1 in which there only exist high-intensity $\beta$-$Si_3N_4$ diffraction peaks and there are no obvious steamed bread-shaped peaks, indicating that the content of the $\beta$-$Si_3N_4$ phase in the prepared material is more than 95 wt % and the content of the grain boundary phase is less than 5%. The typical SEM microstructure of the material is shown in FIG. 2. The material has high density and homogeneous microstructure, the $Si_3N_4$ grains (grayish black region) show a typical bimodal distribution, and the material consists of fine equiaxed $Si_3N_4$ grains and large columnar $Si_3N_4$ grains which are embedded into each other. The content of the grain boundary phase (grayish white region) is low, which is homogeneously dispersed in the $Si_3N_4$ matrix. Further, through the statistical analysis of at least ten SEM pictures, in combination with the total amount of the introduced sintering aids among the materials less than or equal to 5 wt %, it can be concluded that the content of the grain boundary phase in the silicon nitride ceramic material prepared in the present example is less than 5%. The typical TEM microstructure of the material is shown in FIG. 3 (in FIG. 3, B is a partially enlarged view of the dashed box region in A in FIG. 3). The grain boundary phase (grayish white region) is dispersed among the $Si_3N_4$ grains (grayish black region), and the grain boundary phase is composed of a glass phase (light region) and a crystalline phase (dark region). Through the statistical analysis of at least ten TEM pictures, it can be concluded that the content of the crystalline phase in the grain boundary phase of the silicon nitride ceramic material prepared in the present example is about 54 vol %.

Examples 2 to 5

Specific parameters, such as material ratio, sintering aid composition, pretreatment process and sintering process, of Examples 2 to 5 are shown in Table 1 in FIG. 13, and for the process, refer to Example 1. The composition and properties of the prepared material are shown in Table 2 in FIG. 14.

Example 6

Firstly, 3 g of $Si_3N_4$ powder, 55 g of Si powder, 4.5 g of sintering aid powders ($Y_2O_3$:MgO=1.4:2.6, molar ratio), 0.7 g of castor oil, 0.6 g of PEG, 50 g of anhydrous ethanol and 130 g of silicon nitride milling balls were put into a polyurethane-lined ball milling tank with an atmosphere protection function, which was vacuumized and filled with a $N_2$ protective atmosphere in sequence after being sealed by a ball milling tank cover, and ball milling and mixing were performed for 8 hours to obtain a slurry; 4 g of PVB (polyvinyl butyral) and 2.5 g of DBP (dibutyl phthalate) were further added to the aforementioned slurry, and ball milling was continued for 6 hours under the protection of the $N_2$ atmosphere to obtain a homogeneous slurry; secondly, the slurry was degassed in vacuum for 6 hours, and was tape-cast to form a substrate green body under the protection of the $N_2$ atmosphere; thirdly, the formed substrate green body was cut into a desired shape and put into a BN crucible, which was put into a carbon tube furnace; then, heat treatment was performed according to the following process sequence: (1) under the protection of 0.2 $MPa_2$ atmosphere (containing 5% of $H_2$), debinding pretreatment was performed for 3 hours after temperature was raised to 600° C. at a rate of 4° C./min; (2) under the protection of 0.2 MPa $N_2$ atmosphere (containing 5% of $H_2$), nitridation was performed for 6 hours after temperature was raised to 1450° C. at a rate of 5° C./min; (3) under the protection of 3 MPa $N_2$ atmosphere, low-temperature heat treatment was performed for 2 hours after temperature was raised to 1700° C. at a rate of 6° C./min; (4) under the protection of 8 MPa $N_2$ atmosphere, high-temperature sintering was performed for 10 hours after temperature was raised to 1950° C. at a rate of 5° C./min; (5) the resulting silicon nitride ceramic substrate material was cooled to room temperature along with the furnace.

Figure 4:
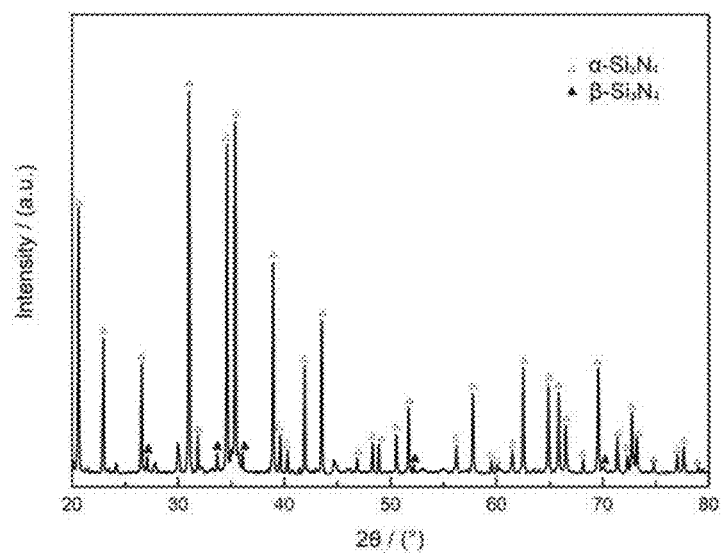
FIG. 4 is an XRD pattern of a material prepared after nitridation in Example 6.
Figure 5:
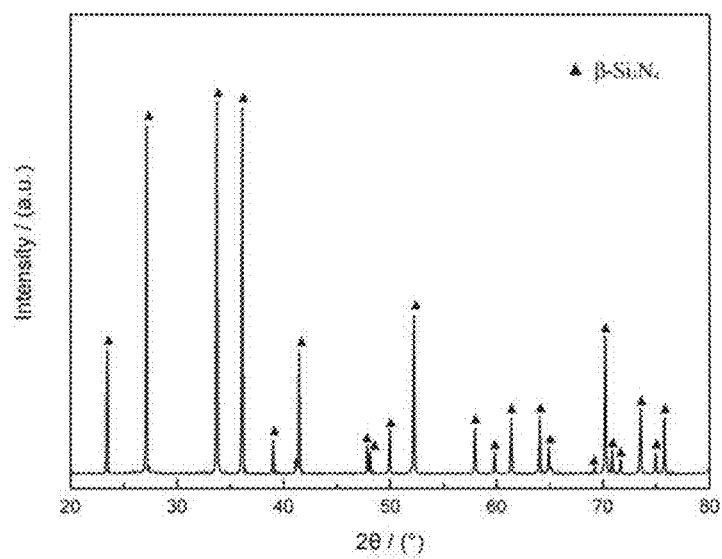
FIG. 5 is an XRD pattern of the material prepared after high-temperature sintering in Example 6.
Figure 6:
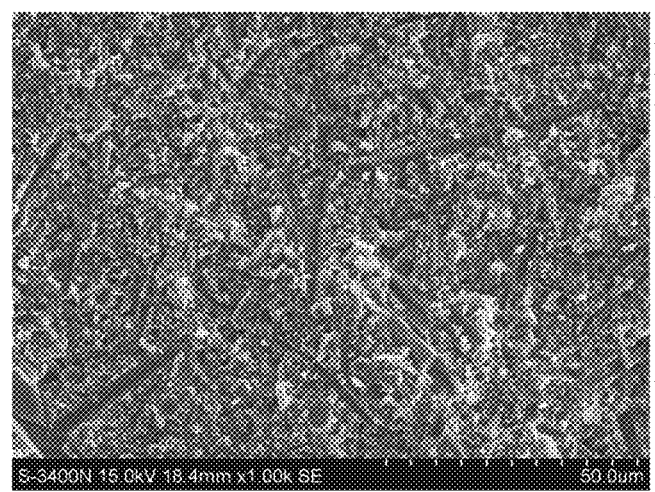
FIG. 6 is a typical SEM microstructure of the silicon nitride ceramic material prepared in Example 6.

The bending strength of the silicon nitride ceramic substrate material prepared in Example 6 is 710 MPa, the thermal conductivity is 110 $W·m^{-1}·K^{-1}$, and the breakdown field strength is 48 KV/mm. The XRD pattern of this material after the nitridation process (the aforementioned process (2)) is shown in FIG. 4. The principal crystalline phase is $\alpha$-$Si_3N_4$, and there is a small amount of $\beta$-$Si_3N_4$ phase (5% to 10%). The XRD pattern of this material after the high-temperature sintering process (the aforementioned process (4)) is shown in FIG. 5 in which there only exist $\beta$-$Si_3N_4$ diffraction peaks and there are no obvious steamed bread-shaped peaks, indicating that the content of the $\beta$-$Si_3N_4$ phase in the prepared material is more than 95 wt % and the content of the grain boundary phase is less than 5 wt %; and further, by adopting the same method as in example 1 for measurement, the content of the crystalline phase in the grain boundary phase of the prepared material is about 60 vol %. The typical SEM microstructure of the fracture surface of the material is shown in FIG. 6. The material has high density and homogeneous microstructure, and consists of fine equiaxed $Si_3N_4$ grains and large columnar $Si_3N_4$ grains which are embedded into each other.

Examples 7 to 10

Specific parameters, such as material ratio, sintering aid composition, pretreatment process, nitridation process and sintering process, of Examples 7 to 10 are shown in Table 1 in FIG. 13, and for the process, refer to Example 6. The composition and properties of the prepared material are shown in Table 2 in FIG. 14.

Example 11

For the process of preparing the silicon nitride ceramic material in Example 11, refer to Example 1, except that the main difference is as follows: 95 g of $Si_3N_4$ powder, 5 g of sintering aid powders ($Y_2O_3$:MgO=1.2:2.5, molar ratio), 1 g of castor oil, 1 g of PEG, 70 g of anhydrous ethanol and 200 g of silicon nitride milling balls were put into a polyurethane-lined ball milling tank with an atmosphere protection function, which was vacuumized and filled with a $N_2$ protective atmosphere in sequence after being sealed by a ball milling tank cover, and ball milling and mixing were performed for 6 hours to obtain a slurry. Drying, sieving, dry press molding (20 MPa) and cold isostatic press molding (200 MPa) were then performed in a nitrogen atmosphere to obtain a green body.

Comparative Example 1

Specific parameters, such as material ratio, sintering aid composition, pretreatment process and sintering process, are the same as those in Example 1 (see Table 1 in FIG. 13). For the process, refer to Example 1, except that the difference is that the nitrogen atmosphere protection measure was not adopted in processes such as ball milling and mixing and green body formation. The composition and properties of the prepared material are shown in Table 1 in FIG. 13. Since the nitrogen atmosphere protection measure according to the present disclosure was not adopted in the material preparation process, the silicon nitride powder among the materials was oxidized to varying degrees, and as a result, both the thermal conductivity and breakdown field strength of the prepared silicon nitride ceramic material were obviously decreased, but the bending strength almost remained unchanged.

Comparative Example 2

Specific parameters, such as sintering aid composition ratio, pretreatment process and sintering process, are the same as those in Example 1 (see Table 1 in FIG. 13), except that the difference is that the total amount of the sintering aids was increased. The composition and properties of the prepared material are shown in Table 2 in FIG. 14. Due to the high content of the sintering aids, the content of the grain boundary phase with low thermal conductivity formed by the sintering aids was high, and as a result, both the thermal conductivity and breakdown field strength of the prepared silicon nitride ceramic material were obviously decreased, but the bending strength almost remained unchanged.

Comparative Example 3

Specific parameters, such as material ratio, types and total amount of sintering aids, pretreatment process and sintering process, are the same as those in Example 1 (see Table 1 in FIG. 13), except that the difference is that the ratio of the sintering aids was different ($Y_2O_3$:MgO=1.2:4.0). The composition and properties of the prepared material are shown in Table 2. Due to the high proportion of MgO among the sintering aids, the eutectic point temperature of the liquid phase formed by the sintering aids was relatively low, leading to severe volatilization at high temperature, resulting in an obvious decrease in both the thermal conductivity and breakdown field strength of the prepared silicon nitride ceramic material.

Comparative Example 4

Specific parameters, such as material ratio, types and total amount of sintering aids, pretreatment process and sintering process, are the same as those in Example 1 (see Table 1 in FIG. 13), except that the difference is that the ratio of the sintering aids was different ($Y_2O_3$:MgO=1.3:2.0). The composition and properties of the prepared material are shown in Table 2. Due to the low proportion of MgO among the sintering aids, the eutectic point temperature of the liquid phase formed by the sintering aids was relatively high, and the material densification effect was relatively poor, resulting in an obvious decrease in both the thermal conductivity and breakdown field strength of the prepared silicon nitride ceramic material.

Comparative Example 5

Specific parameters, such as material ratio, sintering aid composition and pretreatment process, are the same as those in Example 1 (see Table 1 in FIG. 13), and the process is similar to that in Example 1, except that the difference is that the sintering process was one-step sintering. The composition and properties of the prepared material are shown in Table 2 in FIG. 14. Because the low-temperature heat treatment process was not included, severe MgO volatilization began under the condition of insufficient densification, and the material densification effect was relatively poor, resulting in an obvious decrease in both the thermal conductivity and breakdown field strength of the prepared silicon nitride ceramic material.

Comparative Example 6

Specific parameters, such as material ratio, sintering aid composition, pretreatment process and sintering process, are the same as those in Example 1 (see Table 1 in FIG. 13), and the process is same as that in Example 1, except that the difference is that the temperature of low-temperature heat treatment was low. The composition and properties of the prepared material are shown in Table 2 in FIG. 14. Due to the low temperature of low-temperature heat treatment, the material densification effect was relatively poor, resulting in an obvious decrease in both the thermal conductivity and breakdown field strength of the prepared silicon nitride ceramic material.

Comparative Examples 7 and 8

Specific parameters, such as material ratio, sintering aid composition, pretreatment process and sintering process, are the same as those in Example 8 (see Table 1 in FIG. 13), and the process is same as that in Example 8, except that the difference is that the temperature of nitridation was low (Comparative Example 7) or high (Comparative Example 8). The composition and properties of the prepared material are shown in Table 2 in FIG. 14. Due to the low nitridation temperature (Comparative Example 7) or high nitridation temperature (Comparative Example 8), the Si powder among the materials was not sufficiently nitrided (Comparative Example 7) or was partially silicified (Comparative Example 8), resulting in an obvious decrease in the mechanical, thermal and electrical properties of the prepared silicon nitride ceramic material.

Example 12

Figure 7:
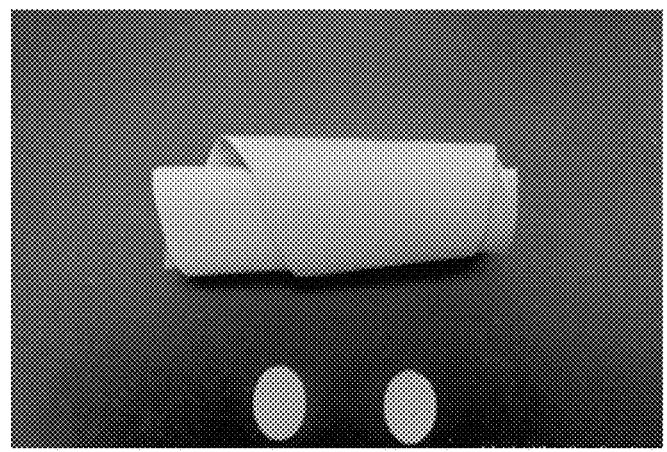
FIG. 7 is an active metal solder foil green body prepared by the present disclosure.

Preparation of solder foil green body: (1) Ag powder (average grain size: 8 μm; oxygen content: 0.01%), Cu powder (average grain size: 6 μm; oxygen content: 0.01%) and Ti powder (average grain size: 2 μm; oxygen content: 0.1%) were weighed according to a weight ratio of 63:35:2 and then put into a polyurethane-lined ball milling tank, 0.2% of oleic acid, 0.5% of PEG, 2% of PVA, 1% of DEP, 200% of silicon nitride milling balls and 110% of anhydrous ethanol were added, 1 atm $N_2$ atmosphere was introduced for protection after vacuumization, and the materials were ball-milled and mixed at 100 rpm for 8 hours to obtain a homogeneously dispersed agglomerate-free slurry; (2) the prepared slurry was vacuumized to remove bubbles for 8 hours, the vacuum degree being −0.5 kPa; (3) the aforementioned slurry without bubbles was tape-cast in a $N_2$ protective atmosphere, and the thickness of a tape-cast film green body was controlled to be 50±10 μm by adjusting the height of a scraper; the tape-cast film green body was dried by a flowing hot $N_2$ atmosphere with increasing temperature, the pressure of the $N_2$ atmosphere was 0.12 MPa, and the temperatures of the $N_2$ atmosphere at the previous stage and the latter stage were 45° C. and 65° C. respectively. (4) the dried tape-cast film green body was cut into a size matching the silicon nitride ceramic substrate prepared in Example 1, thus completing the preparation of a solder foil green body. The prepared active metal solder foil green body is shown in FIG. 7. The foil is 50±5 μm in thickness, has an even, smooth and flat surface and good flexibility, and can be rolled and cut.

Figure 8:
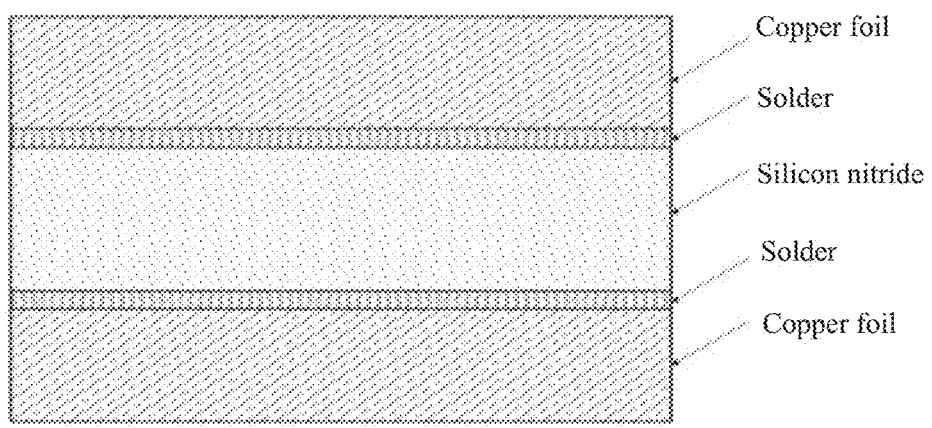
FIG. 8 is a schematic structural diagram of a copper plate-covered silicon nitride ceramic substrate.
Figure 9:
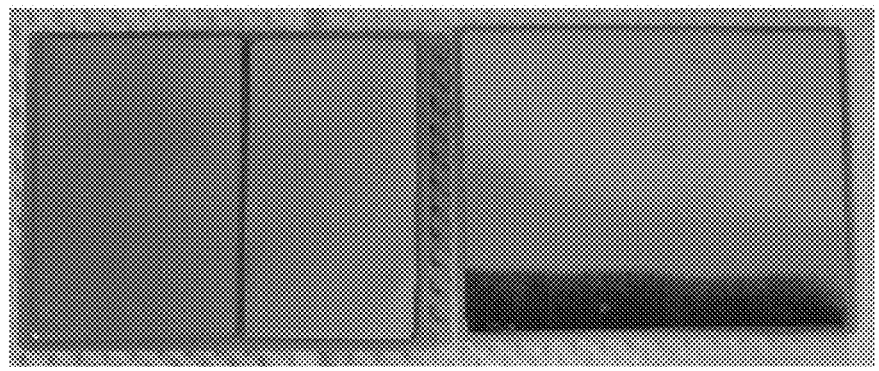
FIG. 9 is a copper plate-covered silicon nitride ceramic substrate prepared in Example 12.
Figure 10:
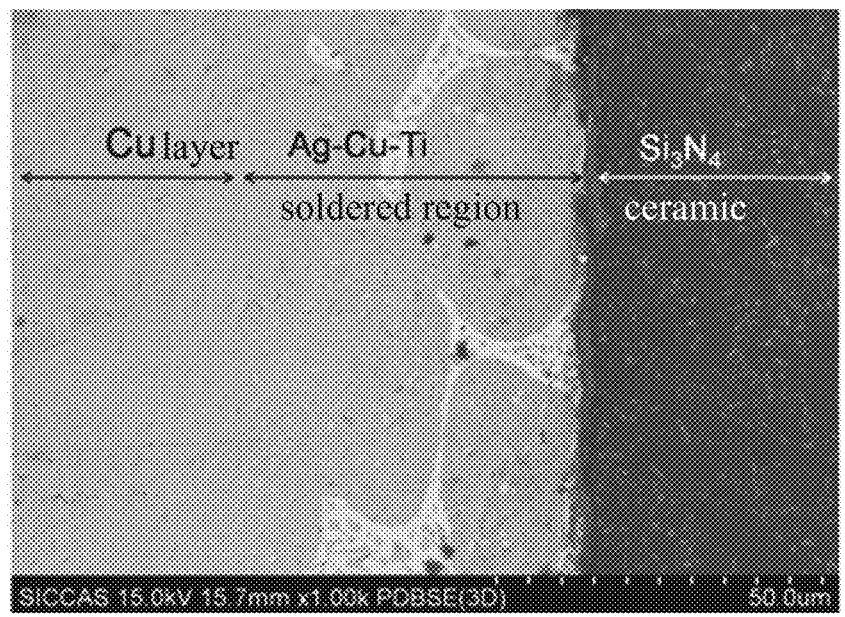
FIG. 10 is a soldered region microstructure of the copper plate-covered silicon nitride ceramic substrate.
Figure 11:
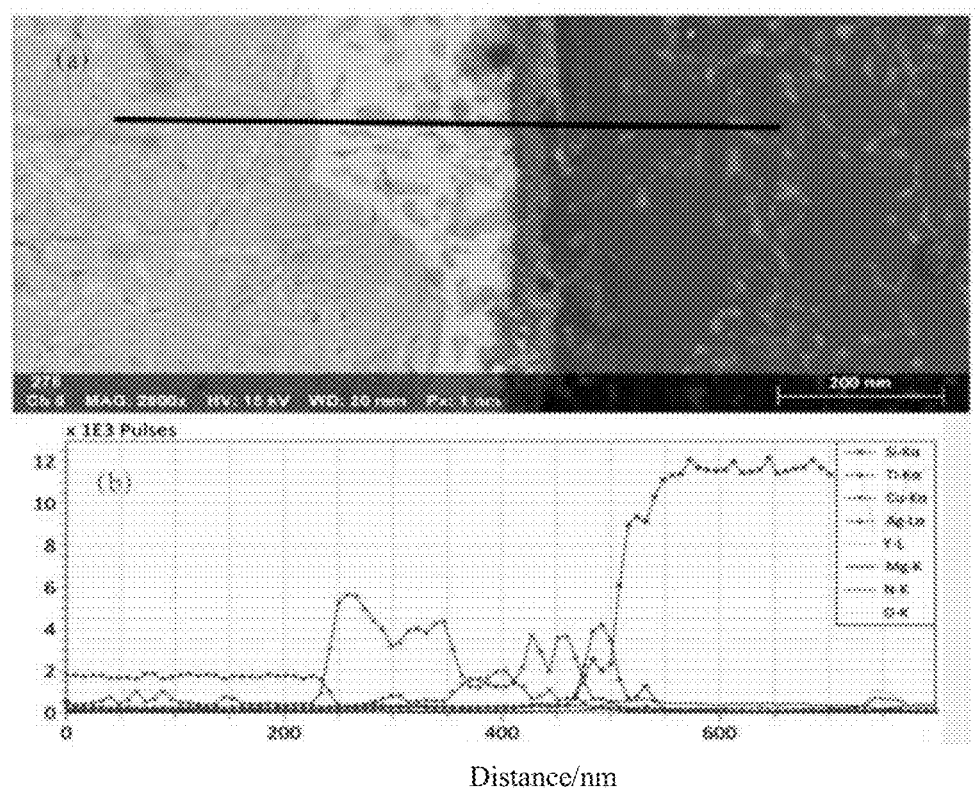
FIG. 11 is a soldered region microstructure (a) and composition analysis (b) of the copper plate-covered silicon nitride ceramic substrate.
Figure 12:
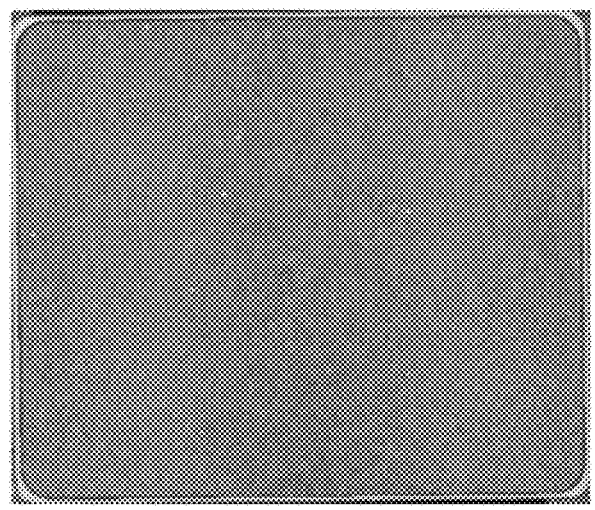
FIG. 12 is an ultrasonic scanning diagram of the copper plate-covered silicon nitride ceramic substrate subjected to high-temperature and low-temperature cyclic thermal shocks.

Vacuum soldering of AMB: (1) The prepared silicon nitride ceramic substrate, the solder foil green bodies and oxygen-free copper foils with a thickness of 0.3 mm were assembled to form a stacked sheet assembly shown in FIG. 8; (2) the stacked sheet assembly was debound at 650° C. kept for 2 hours in 0.15 MPa $N_2$ atmosphere; (3) the debound stacked sheet assembly was put into a vacuum soldering furnace and soldered under a vacuum degree of $10^{-3}$ Pa at 900° C. for 10 minutes; (4) the resulting silicon nitride ceramic copper clad laminate was cooled to room temperature along with the furnace. FIG. 9 shows the prepared silicon nitride ceramic copper clad laminate with high strength, low stress and high reliability. The bonding strength (peel strength of copper foils) is 15 N/mm (referring to GB/T 4722-2017 Test Method for Rigid Copper Clad Laminates for Printed Circuits), and the flatness of the copper clad laminate is 0.2 mm. FIG. 10 and FIG. 11 show the soldered region microstructure and composition analysis pictures of the silicon nitride copper clad laminate, respectively. It can be seen that there is a soldered region with a width of about 50 μm (consistent with the width of the solder foil) between the silicon nitride ceramic substrate and the copper foil layer, and the soldered region is mainly composed of Cu (light gray region) and Ag (grayish white region), Cu forming a substantially continuous phase and Ag forming dispersed Ag particles (small grayish white particles) and a partial Ag continuous phase (grayish white reticulate structure). There is an element diffusion reaction transition region with a width of about 100 nm between the silicon nitride ceramic and the soldered region, forming a new phase (such as $Ti_5Si_3$) formed by the reaction of Ti and Si elements, thus ensuring the soldering strength. After 200 high- and low-temperature cyclic thermal shocks (after being kept at 300° C. for 10 minutes, the silicon nitride ceramic copper clad laminate was immediately put into a room-temperature water bath and quenched for 10 minutes as a thermal shock), the prepared silicon nitride copper clad laminate was intact (not subjected to a limit test of high- and low-temperature cyclic thermal shocks), without no visible defects such as microcracks, warpage and cracking (FIG. 12).

Examples 13 to 16

Specific parameters, such as solder composition, tape-casting, copper foil thickness, debinding and vacuum soldering process, are shown in Table 3 in FIG. 15. For the process, refer to Example 12. The characteristics of the prepared silicon nitride ceramic copper clad laminates are shown in Table 4 in FIG. 16.

Examples 17 and 18

Specific parameters, such as solder composition, tape-casting, copper foil thickness, debinding and vacuum soldering process, are shown in Table 3 in FIG. 15. For the process, refer to Example 12, except that the difference is that the silicon nitride ceramic material prepared in Example 8 was chosen as a silicon nitride ceramic substrate with a thickness of 0.5 mm. The characteristics of the prepared silicon nitride ceramic copper clad laminates are shown in Table 4 in FIG. 16.

Comparative Examples 9 and 10

Specific parameters, such as solder composition, tape-casting, copper foil thickness, debinding and vacuum soldering process, are shown in Table 3 in FIG. 15. For the process, refer to Example 12. The characteristics of the prepared silicon nitride ceramic copper clad laminates are shown in Table 4 in FIG. 16. Because the content of active metal Ti in the solder composition was too low (Comparative Example 9) or too high (Comparative Example 10), both the peel strength of the copper layers of the prepared ceramic copper clad laminate and the thermal shock cycle life of the prepared ceramic copper clad laminate were obviously decreased (after 120 and 150 thermal shock cycles respectively, a crack defect occurred in part of the soldered regions of the ceramic substrate and the soldered copper foils).

Comparative Examples 11 and 12

Specific parameters, such as solder composition, tape-casting, copper foil thickness, debinding and vacuum soldering process, are shown in Table 3 in FIG. 15. For the process, refer to Example 12. The characteristics of the prepared silicon nitride ceramic copper clad laminates are shown in Table 4 in FIG. 16. Because the thickness of the solder foil was too small (Comparative Example 11) or too large (Comparative Example 12), the peel strength of the copper layers of the prepared ceramic copper clad laminate was partially decreased (Comparative Example 11) or obviously decreased (Comparative Example 12), and the thermal shock cycle life was obviously decreased (after 120 and 100 thermal shock cycles respectively, a crack defect occurred in part of the soldered regions of the ceramic substrate and the soldered copper foils).

Comparative Example 13

Specific parameters, such as solder composition, tape-casting, copper foil thickness, debinding and vacuum soldering process, are shown in Table 3 in FIG. 15. For the process, refer to Example 12. The characteristics of the prepared silicon nitride ceramic copper clad laminate are shown in Table 4 in FIG. 16. Because the thickness of the soldered copper foil was too large (2 mm), although the peel strength of the copper layers of the prepared ceramic copper clad laminate was high, due to high thermal stress generated during the thermal shock cycle, the thermal shock life was obviously reduced (after 80 thermal shock cycles, a crack defect occurred between the ceramic substrate and the copper foils).

Comparative Example 14

Specific parameters, such as solder composition, tape-casting, copper foil thickness, debinding and vacuum soldering process, are shown in Table 3 in FIG. 15. For the process, refer to Example 12. The characteristics of the prepared silicon nitride ceramic copper clad laminate are shown in Table 4 in FIG. 16. Due to the low vacuum degree in the process of vacuum soldering, the bonding force between them was low, and as a result, the peel strength of the copper layers of the prepared ceramic copper clad laminate and the thermal shock cycle life of the prepared ceramic copper clad laminate were obviously decreased (after 130 thermal shock cycles, a crack defect occurred between the ceramic substrate and the copper foils).

Comparative Example 15

Specific parameters, such as solder composition, tape-casting, copper foil thickness, debinding and vacuum soldering process, are shown in Table 3 in FIG. 15. For the process, refer to Example 12. The characteristics of the prepared silicon nitride ceramic copper clad laminate are shown in Table 4 in FIG. 16. Because the temperature of the vacuum soldering process was too high (obviously exceeding the eutectic point temperature of the solder), the solder overflowed after being melted at high temperature, and as a result, the ceramic substrate and the copper foils were not effectively soldered together, leading to direct cracking.

Comparative Example 16

Specific parameters, such as solder composition, tape-casting, copper foil thickness, debinding and vacuum soldering process, are shown in Table 3 in FIG. 15. For the process, refer to Example 12. The characteristics of the prepared silicon nitride ceramic copper clad laminate are shown in Table 4 in FIG. 16. Because the temperature of the vacuum soldering process was too low (not fully reaching the eutectic point temperature of the solder), the active metal was not fully diffused to form good chemical bonding, and as a result, the peel strength of the copper layers of the prepared ceramic copper clad laminate and the thermal shock cycle life of the prepared ceramic copper clad laminate were obviously decreased.

Comparative Examples 17 and 18

Specific parameters, such as solder composition, tape-casting, copper foil thickness, debinding and vacuum soldering process, are shown in Table 3 in FIG. 15. For the process, refer to Example 12. The characteristics of the prepared silicon nitride ceramic copper clad laminates are shown in Table 4 in FIG. 16. Because the duration of keeping the temperature of the vacuum soldering process was too long (Comparative Example 17) or too short (Comparative Example 18), the best bonding state between them was not achieved, and as a result, both the peel strength of the copper layers of the prepared ceramic copper clad laminate and the thermal shock cycle life of the prepared ceramic copper clad laminate were decreased to a certain degree.

What is claimed is:
1. A preparation method for a copper plate-covered silicon nitride ceramic substrate, wherein a structure of the copper plate-covered silicon nitride ceramic substrate comprises a silicon nitride ceramic substrate, copper sheets disposed on an upper side and a lower side of the silicon nitride ceramic substrate and soldering layers disposed between the copper sheets and the silicon nitride ceramic substrate; a composition of the silicon nitride ceramic substrate comprises a silicon nitride phase and a grain boundary phase; a content of the silicon nitride phase is more than or equal to 95 wt %; the grain boundary phase is a mixture containing at least three elements, wherein the at least three elements are Y, Mg and O, a composition and a content of the grain boundary phase are controlled by a two-step sintering process, so that the content of the grain boundary phase is less than or equal to 5 wt %, and a content of a crystalline phase in the grain boundary phase is more than or equal to 40 vol %; sintering aids for preparation of the silicon nitride ceramic substrate are $Y_2O_3$ and MgO, a molar ratio of $Y_2O_3$ to MgO is (1.0 to 1.4): (2.5 to 2.9), and the two-step sintering process comprises: in a nitrogen atmosphere with an atmospheric pressure of 0.5 MPa to 10 MPa, performing low-temperature heat treatment at 1600° C. to 1800° C. and high-temperature heat treatment performed at 1800° C. to 2000° C. in sequence; a thickness of the silicon nitride ceramic substrate is 0.2 mm to 2.0 mm; the composition of each of the soldering layers is AgCuTi, wherein a weight ratio of Ag:Cu:Ti is x:y:z, where x is equal to 0.60 to 0.65, y is equal to 0.33 to 0.37, z is equal to 0.01 to 0.04, x+y+z=1, and a thickness of each of the soldering layers is 20 to 60 microns; a thickness of the copper sheet is 0.1 mm to 1.5 mm; the copper sheets, solder foils forming the soldering layers and the silicon nitride ceramic substrate are stacked according to the structure of the copper plate-covered silicon nitride ceramic substrate, and after debinding in a protective atmosphere, vacuum soldering is performed at 860° C. to 920° C. kept for 5 to 20 minutes to obtain the copper plate-covered silicon nitride ceramic substrate.

2. The preparation method for a copper plate-covered silicon nitride ceramic substrate according to claim 1, wherein a total amount of impurities in the silicon nitride ceramic substrate is less than or equal to 1.0 wt %; and the impurities include at least one of lattice oxygen, metal impurity ions and impurity carbon.

3. The preparation method for a copper plate-covered silicon nitride ceramic substrate according to claim 1, wherein the thickness of the copper sheet is 0.2 mm to 1.0 mm.

4. The preparation method for a copper plate-covered silicon nitride ceramic substrate according to claim 1, wherein parameters of the debinding include: a $N_2$ atmosphere pressure: 0.1 MPa to 0.2 MPa; a treatment temperature: 500° C. to 800° C.; and duration of treatment: 1 to 3 hours.

5. The preparation method for a copper plate-covered silicon nitride ceramic substrate according to claim 1, wherein a preparation process for the solder foil comprises the following steps:
 (1) silver powder, copper powder, titanium powder, organic solvent and binder are mixed in a protective atmosphere to obtain a mixed slurry; and
 (2) the mixed slurry is tape-cast and dried in a protective atmosphere to obtain a solder foil.

6. The preparation method for a copper plate-covered silicon nitride ceramic substrate according to claim 5, wherein an average grain size of the silver powder is 5 µm to 20 µm, and an oxygen content is not more than 0.05%; an average grain size of the copper powder is 5 µm to 20 µm, and an oxygen content is not more than 0.05%; an average grain size of the titanium powder is 1 µm to 5 µm, and an oxygen content is not more than 0.2%; and the protective atmosphere is a nitrogen atmosphere.

7. The preparation method for a copper plate-covered silicon nitride ceramic substrate according to claim 5, wherein a tape-cast film green body is dried by a flowing hot $N_2$ atmosphere with increasing temperature, and the $N_2$ atmosphere has a temperature range from 40° C. to 85° C. and an atmosphere pressure of 0.1 MPa to 0.2 MPa.

8. The preparation method for a copper plate-covered silicon nitride ceramic substrate according to claim 5, wherein there are two temperature stages of the nitrogen atmosphere, an atmosphere temperature range of a previous stage is 40° C. to 65° C., and an atmosphere temperature range of a latter stage is 60° C. to 85° C., and the atmosphere temperature of the previous stage is less than the atmosphere temperature of the latter stage.

9. The preparation method for a copper plate-covered silicon nitride ceramic substrate according to claim 1, wherein the preparation method for the silicon nitride ceramic substrate comprises the following steps:
 (1) at least one of silicon powder and silicon nitride powder as an original powder and $Y_2O_3$ powder and MgO powder as sintering aids are added with an organic solvent and a binder and mixed in a protective atmosphere to obtain a mixed slurry;
 (2) the mixed slurry is tape-cast in a protective atmosphere to obtain a green body;
 (3) the green body is put into a reducing atmosphere and pretreated at 500° C. to 800° C. to obtain a biscuit; and
 (4) the biscuit is put into a nitrogen atmosphere with an atmosphere pressure of 0.5 MPa to 10 MPa and subjected to low-temperature heat treatment at 1600° C. to 1800° C. and high-temperature heat treatment at 1800° C. to 2000° C. in sequence to obtain the silicon nitride ceramic substrate.

10. The preparation method for a copper plate-covered silicon nitride ceramic substrate according to claim 9, wherein the protective atmosphere used in the preparation method for the silicon nitride ceramic substrate is an inert atmosphere or a nitrogen atmosphere, and the reducing atmosphere used is a hydrogen/nitrogen mixed atmosphere with a hydrogen content not higher than 5 vol %.

11. The preparation method for a copper plate-covered silicon nitride ceramic substrate according to claim 1, wherein the preparation method for the silicon nitride ceramic substrate comprises the following steps:
 (1) at least one of silicon powder and silicon nitride powder as an original powder and $Y_2O_3$ powder and MgO powder as sintering aids are mixed and formed into a green body in a protective atmosphere;
 (2) the green body is put into a reducing atmosphere and pretreated at 500° C. to 800° C. to obtain a biscuit; and
 (3) the biscuit is put into a nitrogen atmosphere with an atmosphere pressure of 0.5 MPa to 10 MPa and subjected to low-temperature heat treatment at 1600° C. to 1800° C. and high-temperature heat treatment at 1800° C. to 2000° C. in sequence to obtain the silicon nitride ceramic substrate.

12. The preparation method for a copper plate-covered silicon nitride ceramic substrate according to claim 11, wherein the protective atmosphere used in the preparation method for the silicon nitride ceramic substrate is an inert atmosphere or a nitrogen atmosphere, and the reducing atmosphere used is a hydrogen/nitrogen mixed atmosphere with a hydrogen content not higher than 5 vol %.

* * * * *